Figure 1:
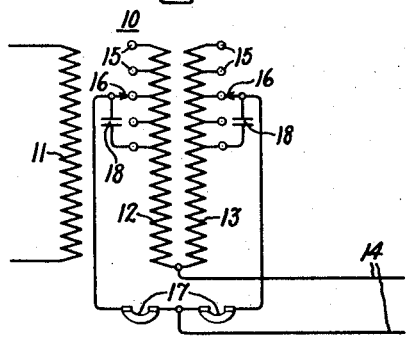

Feb. 26, 1935.  L. F. BLUME  1,992,809

VOLTAGE AND POWER FACTOR CONTROL

Filed April 5, 1933

Inventor:
Louis F. Blume,
by Charles E. Tullar
His Attorney.

Patented Feb. 26, 1935

1,992,809

UNITED STATES PATENT OFFICE 1,992,809

VOLTAGE AND POWER FACTOR CONTROL

Louis F. Blume, Pittsfield, Mass., assignor to General Electric Company, a corporation of New York Application April 5, 1933, Serial No. 664,597

4 Claims. (Cl. 172—246)

My invention relates to voltage and power factor control in electrical power transmission circuits. The load on an electrical power transmission circuit supplied with current from a transformer is usually inductive and tends to draw a lagging current from the transformer. This reduces the power factor and causes a drop in voltage in the circuit and it is therefore customary to introduce a leading or charging current into the circuit to compensate the lagging current. The general object of the invention is to provide an improved combination of a variable voltage transformer and a condenser which has the double function of regulating or adjusting the voltage ratio of the transformer and at the same time to introduce a charging current into the circuit supplying current to the transformer, whereby relatively higher power factor is maintained.

The invention will be better understood from the following description taken in connection with the accompanying drawing in which Figs. 1 to 6 inclusive are diagrammatic views showing different arrangements of voltage regulating or adjusting apparatus provided in accordance with the invention with means including a static condenser for introducing a charging current into a power transmission circuit to maintain high power factor in the circuit. Like reference characters indicate similar parts in the different figures of the drawing.

The transformer 10 indicated in Fig. 1 includes a primary winding 11 and a secondary winding formed in two sections 12 and 13. One end of each of the winding sections is connected to one side of a power transmission circuit 14. Each of the winding sections 12 and 13 is also provided with tap connections 15 which may be connected to the other side of the circuit 14 through a movable contact 16 and a circuit breaker 17. The voltage ratio of the transformer may be adjusted by changing the positions of the movable contacts 16 one at a time along their respective tap connections 15. Arcing at the contacts 16 is prevented by opening the corresponding circuit breaker 17 while each contact 16 is moved, the other circuit breaker 17 and contact 16 meanwhile carrying all the secondary current. In accordance with the invention, a condenser 18 is connected between each movable contact 16 and the corresponding minimum tap connection 15. Thus, when each contact 16 is at the same tap connection 15 to which its condenser 18 is connected, the condenser is short circuited and ineffective. If there is an increase of load on the circuit 14 tending to cause a drop in voltage in the circuit, the contacts 16 may be moved to higher voltage tap connections 15 to maintain the normal voltage of the circuit. This will increase the voltage impressed on the condenser 18 which will then introduce an increased charging current into the circuit supplying current to the transformer and thereby appreciably improve the power factor.

Figure 2:
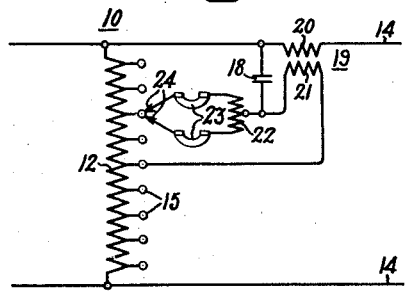

In the arrangement shown in Fig. 2, the transformer 10 has a single winding 12 and acts as an auto transformer. The winding 12 is provided with tap connections 15. A series transformer 19 has a winding 20 connected in series with one side of the secondary load circuit 14. A second winding 21 of the transformer 19 has one end connected to the center of the winding 12 and its other end connected through a reactor 22, a pair of circuit breakers 23 and two contacts 24 which are movable along the tap connections 15. The contacts 24 and circuit breakers 23 are operated in the same manner as the contacts 16 and circuit breakers 17 of Fig. 1 so that the contacts may be moved to successive tap connections 15 without interrupting the current through the winding 21 of the series transformer 19. The reactor 22 prevents excessive circulating current through the contacts when they are connected to different tap connections 15. When the contacts 24 are at the tap connection 15 nearest the side of the circuit 14 containing the series transformer 19, a voltage is impressed on the winding 20 of the series transformer which opposes the voltage in the load circuit 14 and thus the voltage of the load circuit has its minimum value. As the contacts 24 are moved along the tap connections 15 toward the other end of the winding 12, the opposing voltage in the series winding 20 is reduced to zero and then increases in the opposite direction to add to the voltage of the load circuit 14 till the voltage of this circuit finally reaches its maximum value. A condenser 18 is connected between the side of the circuit 14 containing the series transformer winding 20 and the connection between the series transformer winding 21 and the contacts 24. As the contacts 24 are moved from the minimum to the maximum voltage position along the tap connections 15, a voltage increasing from zero to a maximum value is impressed across the condenser 18 which therefore introduces into the circuit supplying current to the transformer an increasing charging current as the voltage of the circuit is increased.

Figure 3:
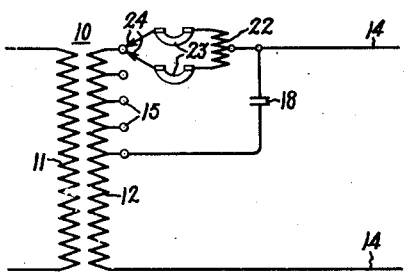

In the arrangement shown in Fig. 3, the transformer 10 has a primary winding 11 and a secondary winding 12 provided with tap connections 15. The secondary load circuit 14 is connected across the winding 12, one side being connected through a reactor 22, circuit breakers 23 and movable contacts 24 to permit the positions of the movable contacts to be adjusted along the tap connections 15. A condenser 18 is connected between the minimum voltage tap connection 15 and the side of the circuit 14 which is connected to the movable contacts 24. When the contacts 24 are at the same tap connection 15 to which the condenser 18 is connected, the voltage of the load circuit 14 is a minimum and the condenser 18 is short circuited and ineffective. As the contacts 24 are moved toward the maximum voltage tap connection, the voltage of the load circuit is increased and an increasing voltage is at the same time impressed across the condenser 18 so that an increasing charging current is introduced into the circuit supplying current to the transformer.

Figure 4:
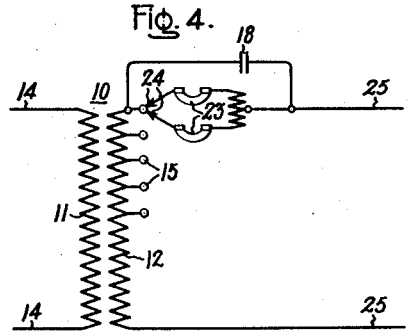

The arrangement shown in Fig. 4 is similar to that shown in Fig. 3, except that the condenser 18 and movable contacts 24 are in the primary circuit of the transformer. The winding 11 is therefore the secondary winding and the winding 12 is the primary winding of the transformer. The condenser 18 is connected between the adjustable side of the primary circuit 25 and the minimum voltage tap connection 15 which, in this case, is at the end of the winding 12. The functions of the movable contacts 24 and condenser 18 are similar to their functions as described in connection with Fig. 3.

Figure 5:
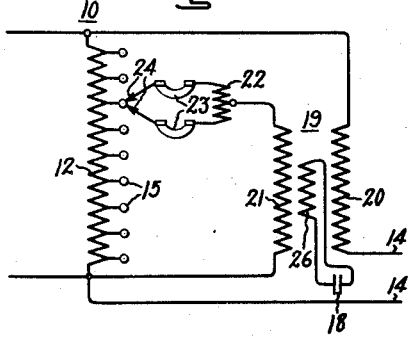

The arrangement shown in Fig. 5 is similar to that shown in Fig. 2 except that the condenser 18 is connected across a tertiary winding 26 of the series transformer 19 and the winding 21 of the series transformer is connected between one end of the winding 12 and the movable contacts 24. As the contacts 24 are moved from the minimum voltage tap connection 15 toward the maximum voltage tap connection to increase the voltage of the secondary circuit 14, a correspondingly increasing voltage is impressed through the windings 21 and 26 of the series transformer on the condenser 18 which introduces an increasing charging current into the circuit supplying current to the transformer.

Figure 6:
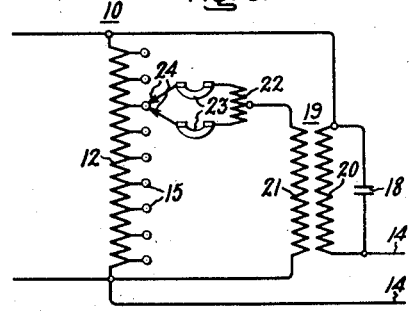

The arrangement shown in Fig. 6 is similar to that shown in Fig. 5 except that the condenser 18 is connected directly across the winding 20 of the series transformer. The charging current from the condenser is thus introduced directly into the circuit 14 instead of by induction from a third winding of the series transformer 19 as in the arrangement shown in Fig. 5.

In each of the arrangements which have been described the voltage across the condenser 18 not only changes as the voltage ratio of the transformer is changed, but the voltage across the condenser changes much more rapidly than does the line voltage. It is common practice to provide a transformer with tap changing mechanism for raising and lowering the secondary voltage about 10% above and below the average value. In order that the power factor of the circuit may be satisfactorily maintained at a high value, it is necessary that the voltage across the condenser which supplies the corrective charging current be correspondingly changed through a much greater range. Then, this result is easily attained by the present invention.

The invention provides a simple and highly efficient means for maintaining normal voltage and high power factor in a power transmission circuit supplying current to a power transformer.

The invention has been explained by describing various arrangements and applications thereof but it will be apparent that changes may be made without departing from the spirit of the invention and the scope of the appended claims.

What I claim as new and desire to secure by Letters Patent of the United States, is,—

1. A transformer including a winding provided with tap connections, a switch for changing tap connections to regulate the voltage ratio of said transformer, a condenser connected to introduce appreciable charging current into a circuit supplying current to said transformer, and means responsive to operations of said switch for varying the voltage across said condenser at a substantially greater rate than that of the voltage ratio of the transformer.

2. A transformer including a winding provided with tap connections, a switch for changing tap connections to regulate the voltage ratio of said transformer, a condenser connected to introduce appreciable charging current into a circuit supplying current to said transformer, and means responsive to changes in said tap connections responsive to operations of said switch for varying the voltage across said condenser at a substantially greater rate than that of the voltage ratio of the transformer.

3. A transformer including a winding provided with tap connections, a switch for changing tap connections to regulate the voltage ratio of said transformer, and a condenser connected in a circuit between said switch and the minimum voltage tap connection, said condenser having a capacity proportioned to introduce appreciable charging current into a circuit supplying current to said transformer.

4. A transformer including a winding provided with tap connections, a switch for changing tap connections to regulate the voltage ratio of said transformer, a series transformer having a winding in series with said tapped winding and a second winding connected between said switch and the minimum voltage tap of said tapped winding, and a condenser connected to said series transformer, said condenser having a capacity proportioned to introduce appreciable charging current into a circuit supplying current to said transformer.

LOUIS F. BLUME.